(12) United States Patent
Nachamkin

(10) Patent No.: US 6,904,374 B2
(45) Date of Patent: Jun. 7, 2005

(54) METHODS AND SYSTEMS FOR PREDICTING ELECTROMAGNETIC SCATTERING

(75) Inventor: Jack Nachamkin, Glen Mill, PA (US)

(73) Assignee: The Boeing Company, Chicago, IL (US)

(*) Notice: Subject to any disclaimer, the term of this patent is extended or adjusted under 35 U.S.C. 154(b) by 20 days.

(21) Appl. No.: 10/675,149

(22) Filed: Sep. 29, 2003

(65) Prior Publication Data
US 2005/0071097 A1 Mar. 31, 2005

(51) Int. Cl.$^7$ .......................... G01R 27/00; G06F 19/00
(52) U.S. Cl. ............................................. 702/65
(58) Field of Search .................. 702/57, 65, 196; 708/490, 607; 703/2–5

(56) References Cited

U.S. PATENT DOCUMENTS 6,353,801 B1   3/2002   Sercu et al.

2003/0167156 A1 * 9/2003   Alba ........................... 703/2

* cited by examiner

Primary Examiner—Michael Nghiem
(74) Attorney, Agent, or Firm—Black Lowe & Graham PLLC

(57) ABSTRACT

Methods and systems for predicting electromagnetic scattering are disclosed. In one embodiment, a method includes covering at least a portion of an analytical model of a target with computational cells, and formulating a plurality of approximation functions. The formulating of the approximation functions includes simplifying a set of method of moments equations based on Kirchhoff's first law to provide an impedance matrix multiplied by a solution vector equated with a right hand side vector. A plurality of boundary conditions are established for the plurality of approximation functions, and the plurality of approximation functions are solved for the solution vector. The impedance matrix is deflated by a sparse transformation determined by the geometry of the scatterer, independent of material properties and frequency, subsequently reducing the computational complexity of the scattering calculation.

42 Claims, 9 Drawing Sheets

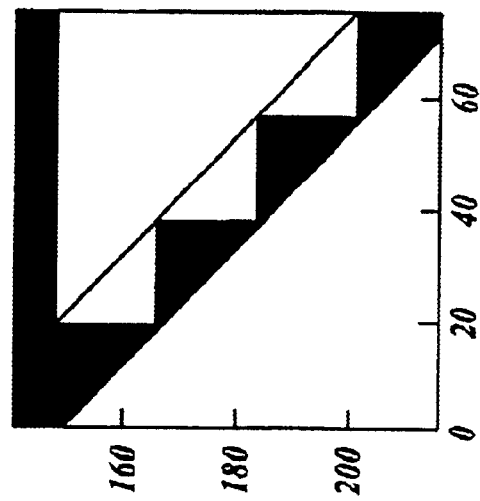
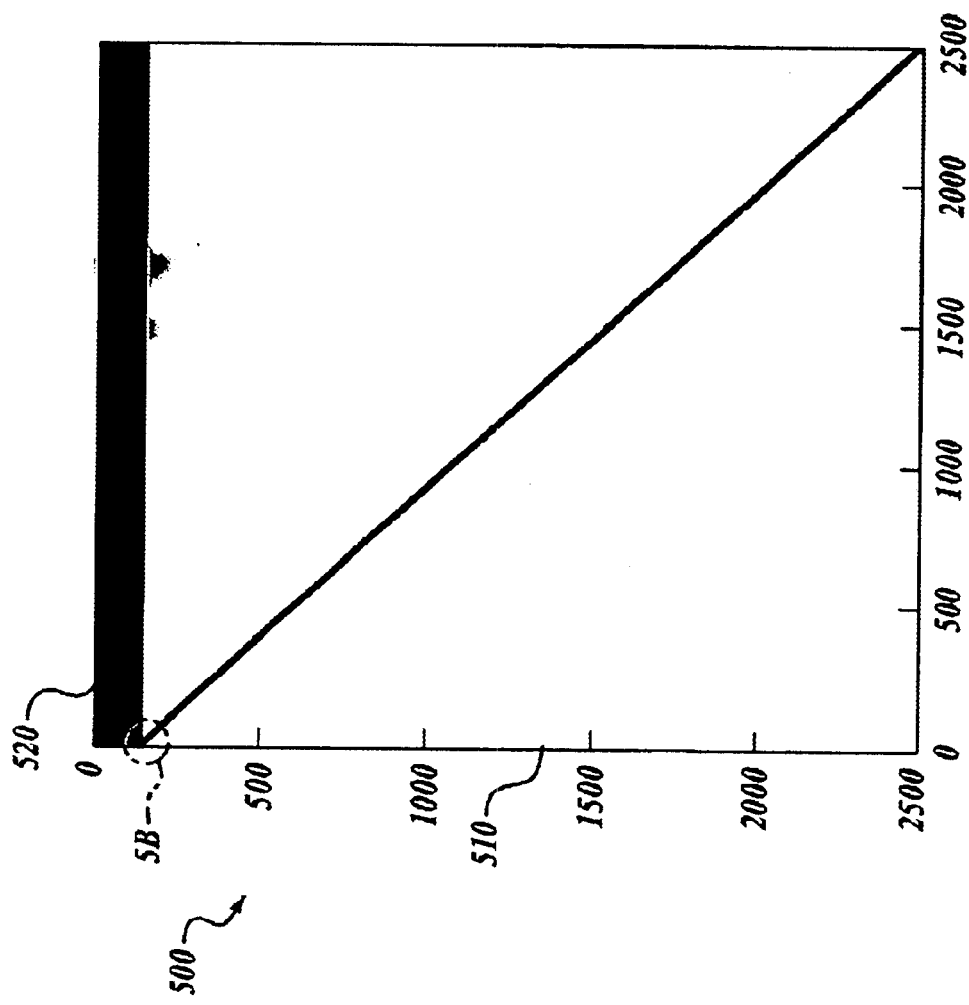
FIG. 5B
FIG. 5A

US 6,904,374 B2

METHODS AND SYSTEMS FOR PREDICTING ELECTROMAGNETIC SCATTERING

FIELD OF THE INVENTION

This invention relates generally to automating electromagnetic scattering predictions and, more specifically, to computer analysis by method of moments.

BACKGROUND OF THE INVENTION

Various numerical full-wave electromagnetic analysis techniques have been used to characterize electromagnetic scattering by passive arbitrary three-dimensional structures. The analysis is generally based on solving Maxwell's electromagnetic (EM) equations for the surface under analysis. Because of the need to capture the signature response from complex structures, such as aircraft, the analysis has been approximated and automated using the method of moments (MoM) and are well suited to the problem only after characterizing the non-planar surface as consisting of a first mesh of finite planar surfaces or cells on the structure. For example is U.S. Pat. No. 6,353,801 granted to Sercu, et al. on Mar. 5, 2002, or R. Harrington, Origin and Development of the Method of Moments for Field Computation, *IEEE Antennas and Propagation Magazine*, June 1990, which references are incorporated herein by this reference.

The basic physics of electromagnetic fields is governed by Maxwell's equations. With computational methods derived from integral equations, a three-dimensional boundary-value problem reduces to a two-dimensional problem over the boundary of the domain of interest, i.e. MoM. However, even with a significant reduction in the number of unknowns, the computational cost of generating the full system matrix and the difficulties in solving the linear equations often makes this approach costly and slow. It is also difficult to formulate the appropriate IE for geometrically complex inhomogeneous structures, possibly requiring a nontrivial derivation of a geometry-dependent Green's function.

A basic understanding of the underlying principles and technologies of finite element simulators is important for generating successful interconnect designs using such simulators. A designer using the finite element tool typically has some understanding of the underlying MoM technology. The designer may select initial mesh parameters (number of cells/wavelength, number of cells/transmission line width, edge meshing on/off, etc.) that will characterize the structure to within an acceptable accuracy. Setting these parameters is always a trade off between simulation accuracy and simulation speed. The larger the number of cells, the more accurate the solution, but slower and more expensive, in terms of computer resources, the solution becomes. For instance, using a PC running at approximately 1 GHz a 50-wavelength linear scatterer using 10 computational cells per wavelength would require days of CPU time. Thus, there is an unmet need in the art for a method and computer program for predicting electromagnetic scattering more efficiently.

SUMMARY OF THE INVENTION

The present invention is directed to methods and systems for predicting electromagnetic scattering from a target. Embodiments of methods and systems in accordance with the present invention may substantially reduce the computational effort required to predict electromagnetic scattering, thereby decreasing the cost and time required to perform such calculations, and improving the efficiency of the prediction process, in comparison with prior art methods and systems.

In one embodiment, a method of predicting an electromagnetic scattering from a target includes covering at least a portion of an analytical model of the target with computational cells, and formulating a plurality of approximation functions. The formulating of the approximation functions includes simplifying a set of method of moments equations based on Kirchhoff's first law to provide an impedance matrix multiplied by a solution vector equated with a right hand side vector. The method further includes setting a plurality of boundary conditions for the plurality of approximation functions, and solving the plurality of approximation functions for the solution vector.

BRIEF DESCRIPTION OF THE DRAWINGS

The preferred and alternative embodiments of the present invention are described in detail below with reference to the following drawings.

FIG. 5 shows an impedance matrix of the scattering problem of FIG. 4 in accordance with an embodiment of the invention;

DETAILED DESCRIPTION OF THE INVENTION

Figure 1:
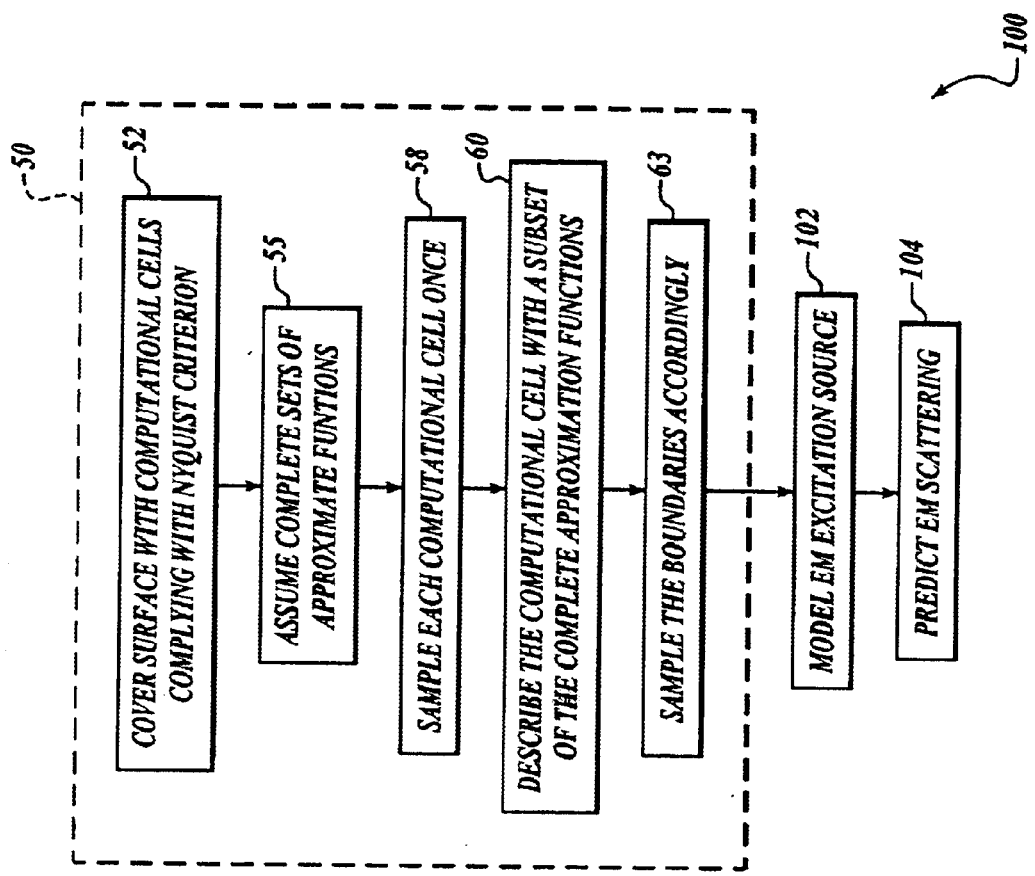
FIG. 1 is flow diagram of a process for predicting electromagnetic scattering in accordance with an embodiment of the invention.

The present invention relates to methods and systems for methods and systems for predicting electromagnetic scattering. Many specific details of certain embodiments of the invention are set forth in the following description and in FIGS. 1–9 to provide a thorough understanding of such embodiments. One skilled in the art, however, will understand that the present invention may have additional embodiments, or that the present invention may be practiced without several of the details described in the following description.

As described more fully below, embodiments of methods and systems in accordance with the present invention incorporate Kirchhoff's First Law into the analytical modeling of a scatterer to provide a simplified analytical model of the scatterer compared with prior art methods. Such embodiments may thereby reduce the description of scattering from an analytic surface to a computation derived by (1) covering the surface with computational cells that comply with Nyquist, realizing that near non-analytic boundaries the Nyquist criterion is not the same as the free-space criterion, (2) assuming complete sets of approximation functions, and (3) sampling only once in each computational cell, with the possible exception of extra sampling points at the boundaries. This strategy may lead to equations of a transformed system wherein the number of linear equations to be solved will be nearly independent of the number of sampling functions, but will be equal to the number of sample points. The analogy of "current loops" in standard circuit analysis may be transformed into single field quantities in each computational cell, sometimes known as "pulses".

The Method of Moments (MoM) applies to general linear-operator equations, such as:

$$Lr=e, \quad (1)$$

where L is a linear operator, r is an unknown response, and e is a known excitation.

The unknown response r is expanded as a sum of basis functions:

$$r = \sum_{j=1}^{N} a_j r_j \quad (2)$$

To solve for the N unknowns $\{a_1, \ldots a_N\}$, linearly independent equations are used. The linearly independent equations are derived from taking the inner product of Eq. 1 with N testing functions $\{s_1, \ldots, s_N\}$.

$$\langle s_i, Lr \rangle = \sum_{j=1}^{N} a_j \langle s_i, Lr_j \rangle = \langle s_i, e \rangle, i = 1, \ldots, N \quad (3)$$

The equations can be written in matrix notation as:

$$Z=a=e \text{ where } Z_{ij}=\langle s_i, Lr_j \rangle, a \quad (4)$$

where a is a column vector of the unknown coefficients and $e_i=\langle s_i, e \rangle$. Matrix inversion of Z yields the desired basis coefficients $a=Z^{-1}e$.

When applying the Method of Moments in an electromagnetic scattering application, L is an integrodifferential operator derived from one of the boundary conditions of Maxwell's equations, e is an incident field term (either electric or magnetic), and r is an approximation of $J_{surface}$, the current induced by the incident wave on the surface of the target. The shape of the target is provided to the MoM code by a CAD file that partitions the surface of the target into smooth planar facets or cells.

The Method of Moments assumes that electromagnetic scatterers (reflectors, emitters, antenna systems, etc.) are made up of piecewise analytic regions that are subdivided into computational cells. The subdivisions within each of the analytic regions will not be the same size and no attempt will be made to make them the same size. Each analytic region will have a well-defined boundary. The computational cells will all have linear dimensions that are smaller than the Nyquist criterion of half a wavelength. The computational cells near the boundaries will have significantly smaller linear dimensions than dictated by Nyquist, while the computational cells more than a wavelength away from the boundaries may be allowed to have linear dimensions that approach a so-called Nyquist criterion, as described more fully below.

A criterion known as the Nyquist sampling criterion states that frequency of signal sampling must be at least twice faster than the highest signal frequency components to accurately reconstruct the information. In other words, for an electromagnetic incident wave having a wavelength λ, the criterion dictates that samples be taken at a radius or Nyquist length of less than λ/2. Other applicable conditions may include: (1) a band-limited function defined on a real line subdivided into regions that may not all be the same size, but the length of each is less than the Nyquist length of the shortest frequency; (2) the function is defined at only one point in each of the subdivisions; and (3) the original function is approximated in each subdivision by a sum of the same number, "N" of expansion functions, chosen from a complete set of functions (each subdivision has "N" functions). These conditions provide enough information to devise an algorithm to determine the coefficients of the expansion functions to calculate the original function. For this reason, the use of the Nyquist criterion allows for the simplification of the Method of Moments technique for field calculation.

Embodiments of methods and systems in accordance with the present invention may advantageously employ Kirchhoff's First Law. Kirchhoff's First Law states that the current flowing into a junction in a circuit (or node) must equal the current flowing out of the junction. Kirchhoff's First Law is a special case of the more general Maxwell's equations. Certain similarities between the analysis of nodes in a circuit and electromagnetic scattering by passive arbitrary three-dimensional structures by MoM exist, including the following: (1) MoM involves inversion of a large impedance matrix, while AC circuit analysis also inverts an impedance matrix; (2) MoM subdivides a scatterer into discrete regions, these regions being generally mutually interactive, while AC circuits are composed of discrete elements, these elements being generally mutually interactive.

There are, however, differences between current analysis of AC circuitry and MoM analysis. Unlike AC circuitry analysis, in MoM, Kirchhoff's First Law is not generally assumed, nor are time-varying electromagnetic fields considered to be conservative (energy is lost due to radiation). Nonetheless, as the numbers of subdivisions or cells of a "smooth" scatter increases, the solution, as represented by values of currents defined at the discrete elements, becomes smoother. This implies that the individual derived currents are not totally independent, but limit to the samples of an analytic function defined on the scattering surface. The implication, then, is that, in the infinite limit of discrete elements on a finite surface, the amount of information supplied for solution becomes redundant.

FIG. 1 is flow diagram of a method 100 for predicting electromagnetic scattering in accordance with an embodiment of the invention. In this embodiment, the method 100 includes modeling a target (or scatterer) at a block 50. At a block 102, at least one electromagnetic (EM) excitation source is modeled. Finally, the EM scattering from the target is predicted at a block 104.

As further shown in FIG. 1, the modeling of the target at block 50 includes nominating cells and forming an impedance matrix. In this way, an analytic surface can be reduced to a computational space. More specifically, at a block 52 the surface is covered with computational cells that comply with the Nyquist criterion. The cells are defined realizing that near non-analytic boundaries the Nyquist criterion is not the same as the free-space criterion. The criteria that the values and derivatives of the current at the boundaries of the computational cells, as well as the boundary conditions imposed on the boundaries of the individual analytic sections of the scatterer, lead to equations that are independent of frequency of the incident wave.

At a block 55, approximation functions are assumed. Such functions are independent and chosen as subsets of complete sets, in the mathematical sense. These functions expressed as equations are only dependent on the geometry and topology of the scatterer. In general, since these equations connect the linear combinations in each computational cell, they are not totally independent. These equations can be represented by a sparse matrix multiplying a column vector of coefficients of all the functions in all the computational cells.

At a block 58, each computational cell is sampled once. By sampling once, the block 58 might also include sampling of extra sampling points at the boundaries. Sampling thus will lead to equations of a transformed system. The number of linear equations to be solved will be nearly independent of the number of sampling functions, but will be equal to the number of sample points. The "current loops" in standard circuit analysis are analogous to the transformed single field quantities in each computational cell.

At a block 60, the computational cell is described with a subset of the complete approximation functions assumed at the block 55. Within each computational cell, the current will be assumed to have a form that is a linear combination of analytic functions chosen from complete sets of functions. In a presently preferred embodiment, these functions are chosen to be either polynomials or power series functions. Although there is really no restriction on which mathematically independent set of functions may be used, some types of functions may provide more stable and accurate solutions for a given application.

After choosing a computational mesh and a set of functions, the boundary conditions that are to be used in each computational cell are determined at a block 63. In one embodiment, a predetermined number of derivatives, as well as the values at the boundaries of the computational cells, are forced to be continuous. In addition, the value of the ultimate function to be approximated is to be matched at one or more sample points within each computational cell. Further, the incident, driving wave, which is being scattered, is sampled at the aforementioned sample points. A straightforward computation will determine the number of sample points needed to completely determine all the coefficients of the linear combinations of functions in each computational cell.

Since the aforementioned equations number less than the total number of unknown coefficients, the number of sample points must make up the difference. The wave conditions at the sample points, computed by calculating the contributions of all the functions in the computational cells, will be represented by a dense matrix multiplying the same column vector of all the coefficients. This dense matrix is dependent on geometry as well as the frequency of the incident wave. The dense matrix is, however, only dependent on the frequency of the incident wave, and not the geometry of the wavefront of the incident wave.

Sampling points distributed into computational cells can be considered from a sampling-theory viewpoint. Not only should the sampling points sample the incident wave, they should simultaneously sample the geometrical scattering target and the resultant current distribution. To ascertain whether the sampling is appropriate, the method is mindful of each of the following quantities: (1) the function of the field of the incident wave at the surface(s) of the scatterer; (2) the distribution of spatial points on the geometrical scatterer; and (3) the function of the current on the scatterer.

Each of the quantities may be reconstructable from the sample points chosen. Obviously, sharp corners and sharp creases, as well as sudden changes in material properties will demand denser clustering of sample points. It is not generally true that a criterion for linear cell sizes can be given by only knowing the frequency of the incident wave.

Figure 2:
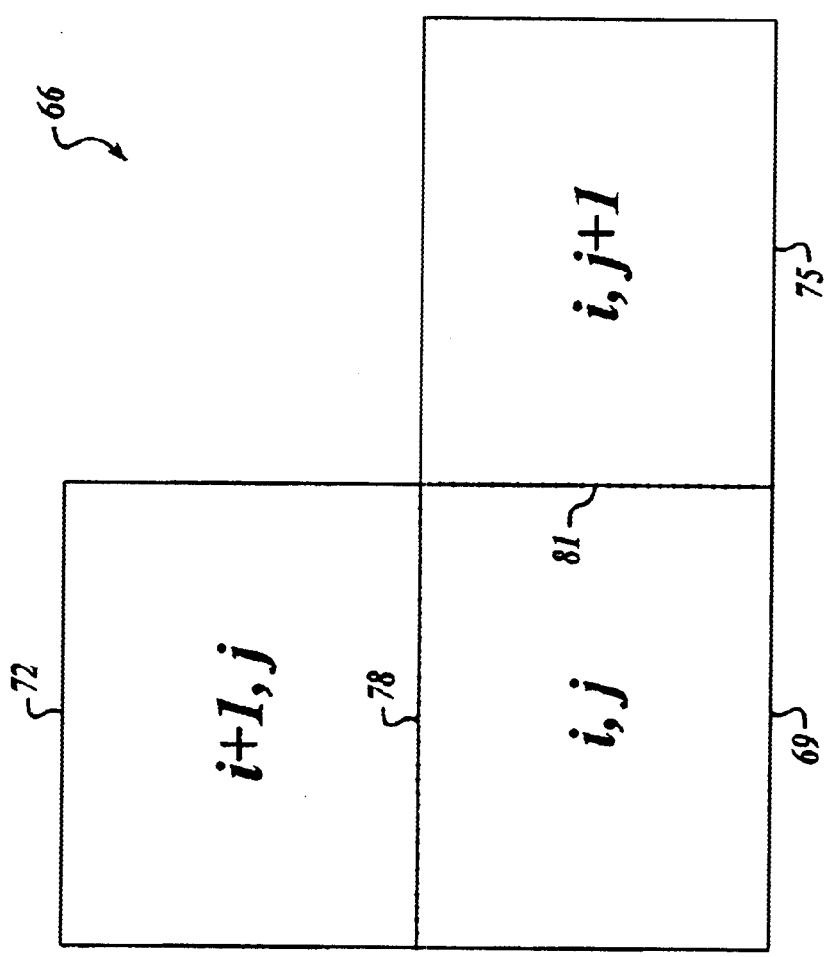
FIG. 2 is an enlarged view of a set of computational cells in accordance with another embodiment of the invention.

By means of illustration, referring to FIG. 2, a set of computational cells 66 is considered. A first cell 69 with coordinates i, j is neighbored by a second cell 72 with coordinates i+1, j and by a third cell 75 with coordinates i, j+1. A first boundary 78 is defined by the adjacent cells 69 with coordinates i, j, the second cell 72 with coordinates i+1,j. A second boundary 81 is defined by the adjacent cells 69, with coordinates i, j, and 75, with coordinates i, j+1. The analytic function describing surface currents in the method can be expressed, in an isolated computational cell as $$J_x = \sum_{m,n} a_{m,n} x^m y^n; \quad J_y = \sum_{m,n} b_{m,n} x^m y^n; \quad 0 \le m, n \le N, \quad (5)$$

where the variables x and y are internal coordinates associated with the cell. The number of unknowns (a's and b's) to be determined is equal to (N+1)(N+2). For each successive integer, k, there are k+1 terms for each component of the current. The number of equations associated with the two boundaries 78 and 81 and the wave sampling in that cell must equal the number of unknowns in Eq. (5) for the cell 69 with coordinates i, j.

Analyticity of the current implies that all the components of the current and all their derivatives are continuous. This allows great leeway in the manner of expressing the inter-cell boundary conditions. Below is one embodiment that employs the continuity of the induced charge and the sum of current components. It should be noted that different embodiments might result in solutions that are more stable and accurate than others.

Kirchhoff's law of current continuity and the analyticity of the charge distribution, or divergence of the current, at the boundaries will supply the equations. Except at boundaries 78 and 81, it is only necessary to consider the two cell boundaries mentioned above.

To enumerate the equations at each boundary 78 and 81, it should be realized that the divergence of the current functions in Eq. (5) produces an analytic function whose highest order is N−1. That is, there are ½N(N+1) terms in the divergence:

$$div(\bar{J}) = \sum_{m,n} c_{m,n} x^m y^n; \quad 0 \le m, n \le N - 1. \quad (6)$$

Note that the sum in Eq. (6) will support ½N(N+1) mixed partial derivatives of the type $$D(p, q) \equiv \frac{\partial^{p+q}}{\partial x^p \partial y^q}; \quad 0 \le p + q \le N - 1. \quad (7)$$

For each component of the current there are two Kirchhoff continuity equations. There are two wave-sampling points at the center of the computational cell. There are ½N(N+1) derivative boundary conditions at each boundary. The total number of definitional equations up to this point is N(N+1)+4. Four equations are obtained by considering the highest order terms in the scalar function $J_r=J_x+J_y$. At the right boundary 78, the functions D(p,q)J, will be assumed continuous, where p+q=N and p,q≠0. Similar logic holds at the upper boundary 81. The number of added conditions is 2N−2. Thus, a total of (N+1)(N+2) equations and (N+1)(N+2) unknowns define an impedance matrix, as described more fully below.

Only two of the equations have any relation to the species of incident or outgoing wave, beyond the assumption of analyticity. Therefore (N+1)(N+2)−2=N(N+3) equations out of the total are derived only from the topology of the scatterer (emitter, antenna system, etc.). These equations are invariant under changes in frequency, depending only on the overall topology of the target object and details of its reduction to a meshed surface.

Spacing the computational-cell centers reasonably within the Nyquist length will sample the waves and current components, "reasonably" far away from the boundaries of a presumably smooth surface. Sampling near a boundary will have to take into account the geometry and topology of the boundary, as well as the behavior of the current and subsequent fields near the boundary. Since these quantities can vary appreciably over a short distance, the equivalent Nyquist sampling rate must be increased near boundaries. In other words, the computational cells "near" boundaries must have smaller linear dimensions. Presumably great deal of the "Nyquist slack" can be taken up by increasing the order, N, in Eq. (5). Asymptotic fields in the neighborhood of a boundary presumably have modulating forms that are independent of frequency.

For example, near the tip of a cone the current might go to zero in such a manner as to induce a singularity in the electromagnetic field. Standard MoM computer code can reproduce this result only with great expenditure of resources and time. However, scaling the cell sizes and along with them the variables x and y in each cell, such that 0≦x,y≦1 can allow as close an approximation as one wishes, subject to being able to accurately invert the relevant matrices.

Figure 3:
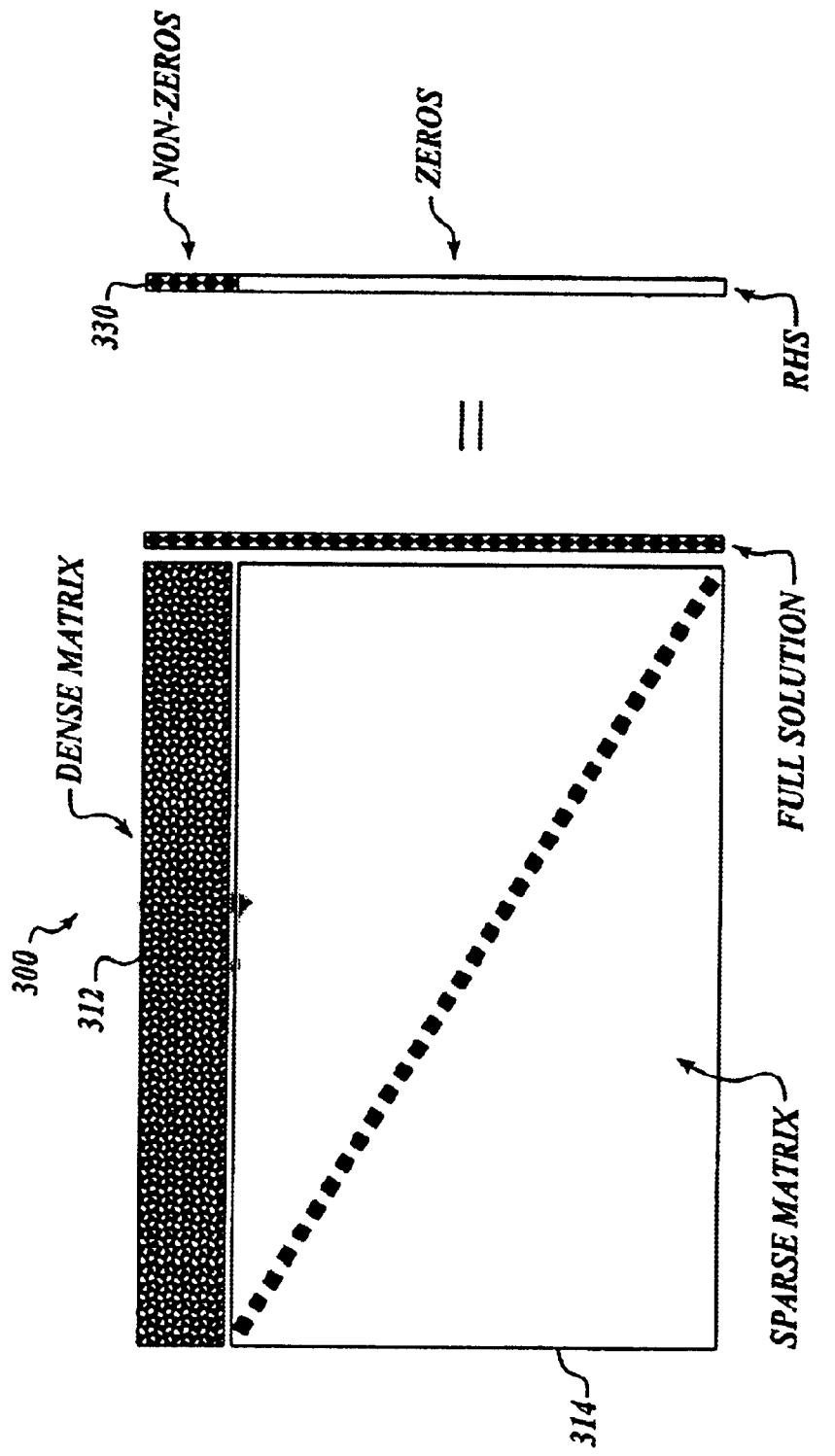
FIG. 3 is a schematic view of a matrix representation of a set of simultaneous equations for predicting electromagnetic scattering in accordance with an embodiment of the invention.

By employing Kirchhoff's First Law in modified versions of the conventional Method of Moments formulation in accordance with embodiments of the present invention, the above-referenced impedance matrix is substantially simplified, and may be characterized as being made up of two primary parts. For example, FIG. 3 is a schematic view of a matrix representation 300 of a set of simultaneous equations for predicting electromagnetic scattering in accordance with an embodiment of the invention. In this embodiment, the impedance matrix 310 is multiplied by a solution vector 320 which equals a right-hand side (RHS) vector 330.

As further shown in FIG. 3, an "upper" part 312 of the impedance matrix 310 is non square and relatively dense. This dense submatrix 312 may express the interactions of all the current components at the sampling points. Another way of saying this is that the matrix elements may represent the field strengths (electric or magnetic) at the sample points due to the current components in all the computational cells. This dense submatrix 312 is typically dependent on geometric distances and orientations between sample points and current sources, as well as frequency.

With continued reference to FIG. 3, a lower sparse submatrix 314 may express the analyticity of the current. This may be understood as a generalization of Kirchhoff's law in standard circuit analysis. In standard circuit analysis the current along an element (circuit branch) is strictly constant, so that no derivative of the currents is relevant. In the generalized case, however, the currents may not be constant within a computational cell, but may be analytic (all derivatives existing) if, for example, the surface being covered by the computational cells is smooth (all surface derivatives exist).

In the standard case and in the general case, the expressions of the continuity of current, charge, and analyticity may be characterized as local interactions between neighboring computational cells. Unlike the field case (upper submatrix 312) that depends on nonlocal interactions, the lower submatrix 314, dealing with continuity of quantities at cell boundaries, is necessarily sparse. This sparse submatrix 314 may have a general form that depends on topology, independent of size of the scattering surface, and independent of the frequency of the wave field.

For embodiments of methods and systems in accordance with the invention, an analogy can be drawn between standard circuit analysis and the RF "circuit" analysis. For example, in the standard case the impedance matrix 310 includes the sparse Kirchhoff submatrix 314 that may be diagonalized using a transform employing only arithmetic "adds". This advantageously transforms the problem into calculating current "loops", which may provide substantial savings of computational effort. Instead of inverting a matrix that is of the order of N+B (number of nodes plus number of branches) as required by conventional methods, the reduced matrix 310 in accordance with the invention is order B−N+1, for a single unconnected island of elements, even if the elements have mutual nonlocal interactions such as inductance and capacitance. In accordance with one aspect of the invention, the impedance matrix 310 for a single loop of mutually interacting circuit elements may be reduced to a single equation by the same transform that would reduce a loop of non-interacting resistors to a single equation.

It will be appreciated that once an analytical surface of a scatterer is covered by computational cells, the form of the sparse topological matrix is determined and invariant to interactions that may be attributable to physical properties of the surface. In addition, once the theoretical approximate Nyquist limitation for sampling is reached, by appropriately choosing cell sizes, variations of the waves within the cells are determined by appropriate numbers of approximation polynomials within each cell. In one particular aspect, at (or slightly less than) Nyquist spacing, no more than a half wavelength of surface wave will "fit" in each cell in any direction.

It may also be appreciated that the resolution of the fine structure of the waves in each computational cell may be determined by the number of approximating polynomials (or other complete sets of analytic functions) used to model the waves in each cell. The fact that these analytical approximating functions are not independent from cell to cell leads to the highly advantageous and remarkable conclusion that adding extra functions does not appreciably increase the size of the matrix 310 that has to be inverted. This follows from the fact that the analyticity of the waves forces the functions, their derivatives, and any quantities derived from the functions to be continuous at cell boundaries. Adding more functions leads to adding more purely local topological constraints, which leads to deflating the matrix 310 to its size it would have if fewer functions were used.

In accordance with further embodiments of the present invention, by choosing the approximation functions correctly, the number of equations may always be on the order of the number of computational cells. That is, except for the appearance non-analytic boundaries (edges of cubes, etc.), taking analyticity into account generates an impedance matrix 310 that reduces to a matrix that is equivalent to a standard MoM matrix with only a single sample in each computational cell. The appearance of non-analytical boundaries may have only a very small effect on the overall size of the deflated matrix as the number of approximating functions in each cell increases. Thus, instead of a conventional "rule of thumb" requirement of ten or more sample points per wavelength, for embodiments of methods and systems in accordance with the present invention, the Nyquist criterion of two samples per wavelength will be a better predictor of the total number of samples needed.

Since fields at edges, "creases", and corners may not behave like waves in free space, these types of breaks from analyticity may deserve or require more samples, but the additional samples needed beyond free-space Nyquist are generally a small percentage of the total.

The nearly vacuous analogy from standard circuit theory would be to examine what would happen if the branch elements were broken into any number of pieces in series. Even though the new number of branches and nodes will increase, the final number of equations (number of independent loop currents) will be unchanged.

Embodiments of methods and systems in accordance with the present invention may advantageously reduce the computational effort required to predict electromagnetic scattering. This advantage is graphically shown in FIG. 8, which shows a comparison 800 of the impedance matrix 310 of FIG. 3 with an impedance matrix 810 of a conventional Method of Moments formulation. The impedance matrix 310 in accordance with an embodiment of the present invention requires substantially less computational resources to invert during the solution process. In some embodiments, this result may be achieved because the description of scattering from an analytic surface may be reduced to a computation derived from (1) covering the surface with computational cells that comply with Nyquist, realizing that near non-analytic boundaries the Nyquist criterion is not the same as the free-space criterion, (2) assuming complete sets of approximation functions, and (3) sampling only once in each computational cell, with the possible exception of extra sampling points at the boundaries. This will lead to equations of a transformed system. The number of linear equations to be solved will be nearly independent of the number of sampling functions, but will be equal to the number of sample points. The analogy of "current loops" in standard circuit analysis is transformed single field quantities in each computational cell.

The near-neighbor coupling between the approximating functions that expand the field quantities is contained in the purely topological transformation that deflated the original matrix. Since this transformation can be expressed in terms of orthogonal and/or elementary (in the technical sense) matrices, calculating the actual currents and fields from the transformed system by applying the inverse transformation is almost trivial after the deflated matrix is inverted.

If the cell covering of the scatterer is unchanged, the transformation deflating the impedance matrix need only be calculated once, and subsequently applied to impedance matrices calculated for different frequencies associated with the electromagnetic field being investigated. Obviously, then, the sparse submatrix need only be calculated once for each topological covering. The analogy with standard circuit theory is that the transformation reducing a network to loops is independent of the driving frequency and/or the value of the branch circuit elements.

Figure 4:
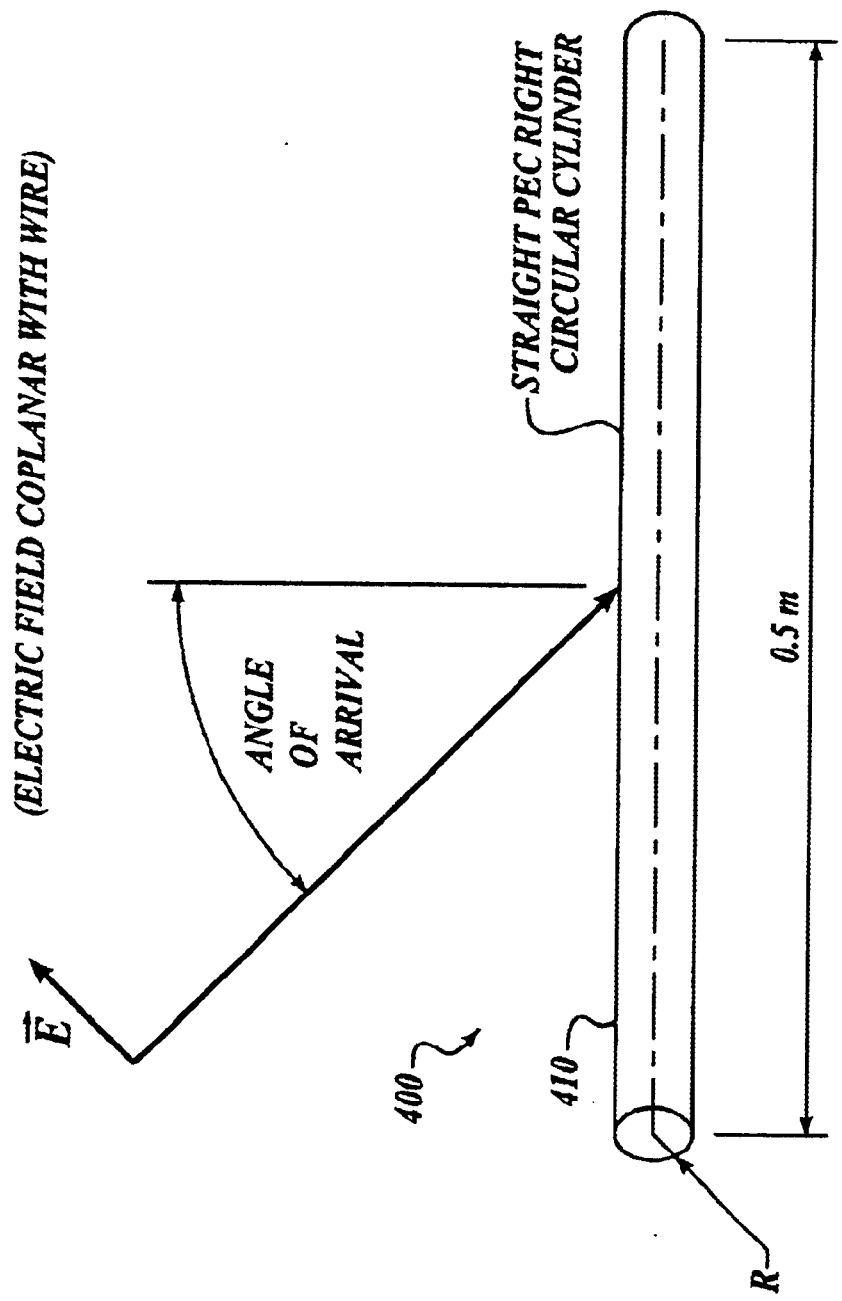
FIG. 4 is a schematic view of a one-dimensional scattering problem including a straight small-diameter wire in accordance with another embodiment of the invention

For example, FIG. 4 is a schematic view of a one-dimensional scattering problem 400 including a straight small-diameter wire 410 in accordance with an embodiment of the invention. FIG. 5 shows an impedance matrix 500 of the scattering problem 400 of FIG. 4 in accordance with an embodiment of the invention. In this embodiment, the impedance matrix 500 represents a case where the wire is subdivided into 139 computational cells, each having nineteen approximating functions (powers of distance). In FIG. 5, "dots" within the impedance matrix 500 represent non-zero entries. The full matrix is of order 19×139=2731.

Figure 6:
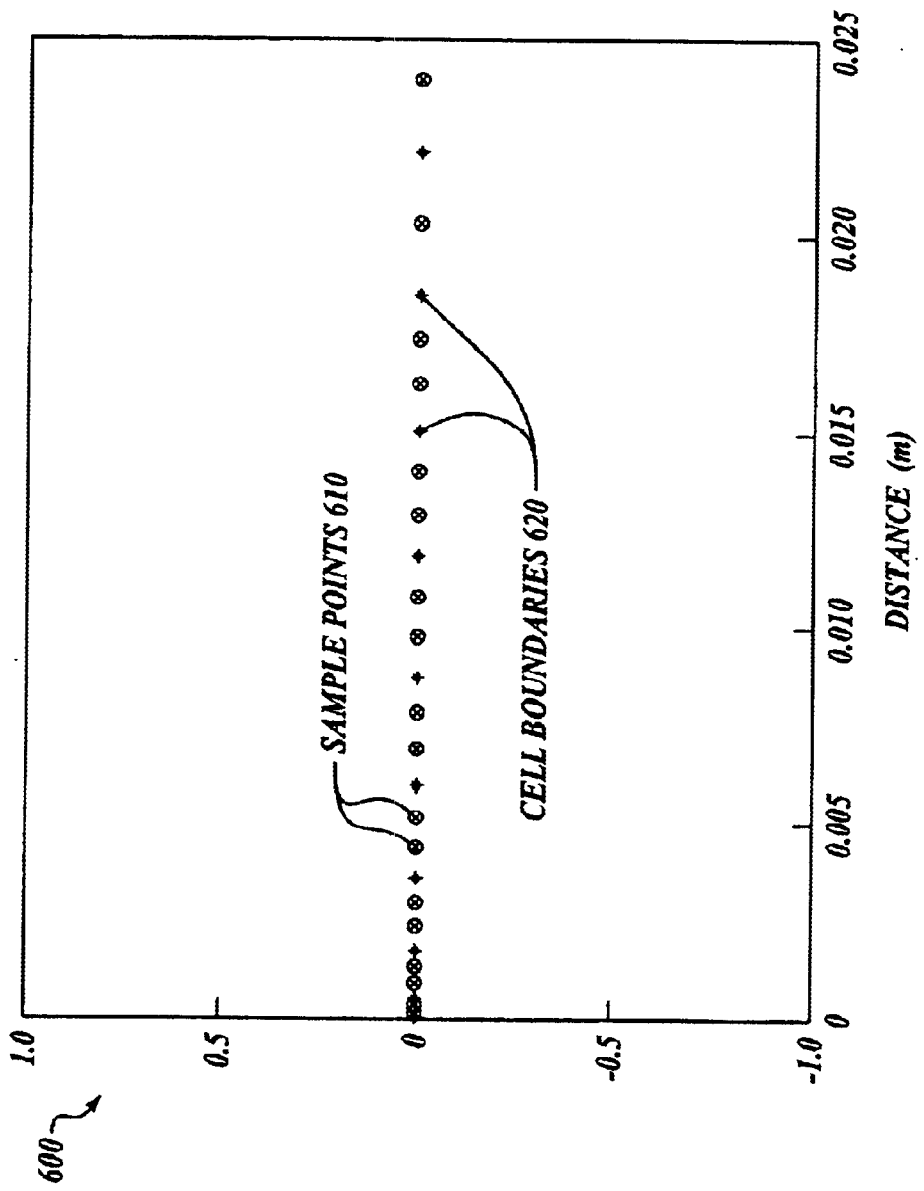
FIG. 6 shows a representative placement of a plurality of sample points for the scattering problem of FIG. 4 in accordance with a further embodiment of the invention.

FIG. 6 shows a representative placement 600 of a plurality of sample points 610 for the scattering problem 400 of FIG. 4 in accordance with a further embodiment of the invention. In this embodiment, there may be 154 sample points (not all are shown) 610, with the "extra" sample points 610 beyond one in each cell at distributed at the ends of the wire. In this embodiment, approximately one or two sample points 610 are distributed between each cell boundary 612, although a greater or fewer number of sample points 610 may be employed.

As shown in FIG. 5, a lower submatrix 510 of the impedance matrix 500 is sparse and banded. This general sparse form will reappear in higher dimensions, with more bands.

It is this sparse submatrix 510, which is invariant as soon as the cell geometry and approximating functions are determined, that leads to matrix deflation. As described above, an upper submatrix 520 of the impedance matrix 500 is non-square and relatively dense.

Embodiments of the present invention may take advantage of the fact that the lower sparse matrix 510 can be transformed into a lower triangular matrix by an appropriate set of operations. Specifically, a well-known technique known as the QR decomposition theorem guarantees that one can always find an orthogonal matrix that post-multiplies the sparse submatrix 510 and transforms it into a lower-triangular matrix. That is, after the transformation, the only non-zero matrix elements (except for round-off errors) will lie above the main diagonal.

Figure 7:
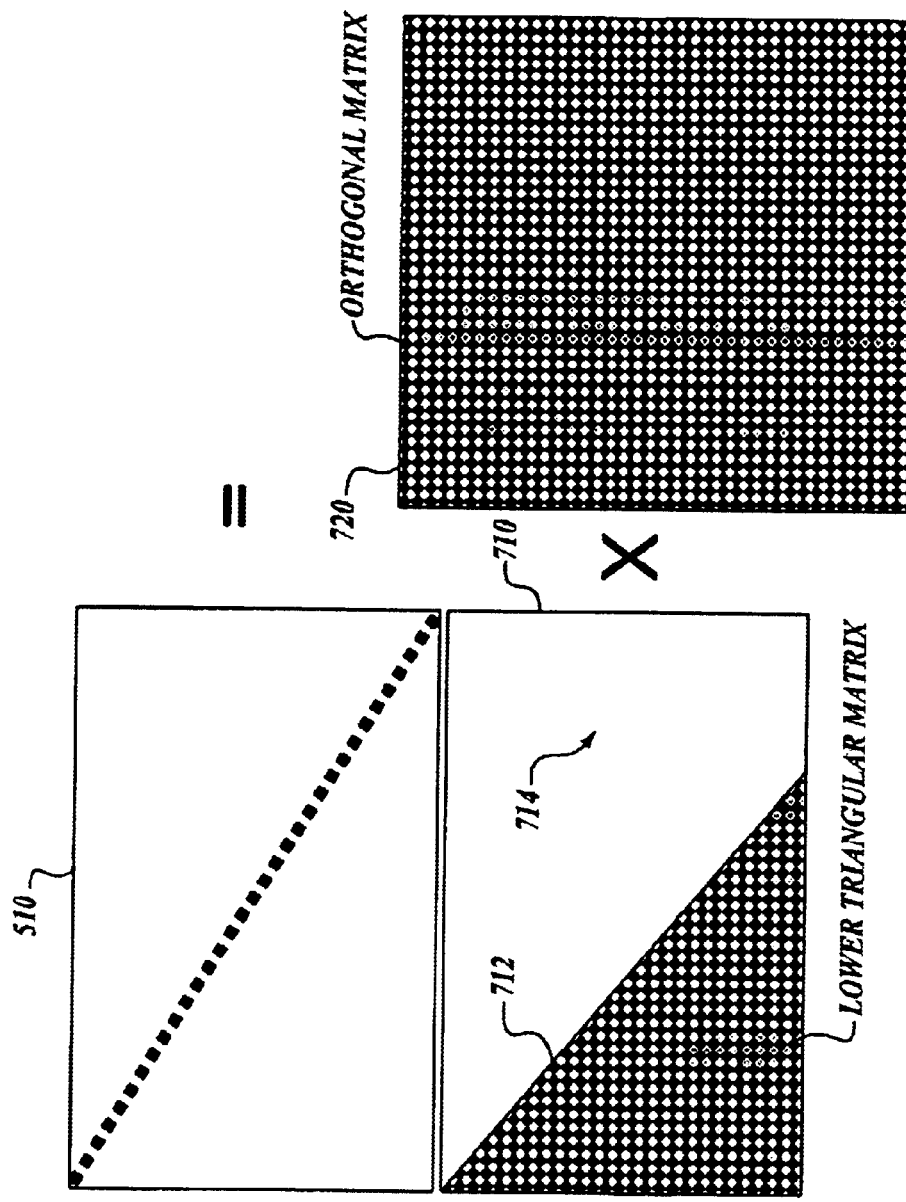
FIG. 7 is a graphical representation of a QR decomposition of the lower submatrix of FIG. 5.
Figure 8:
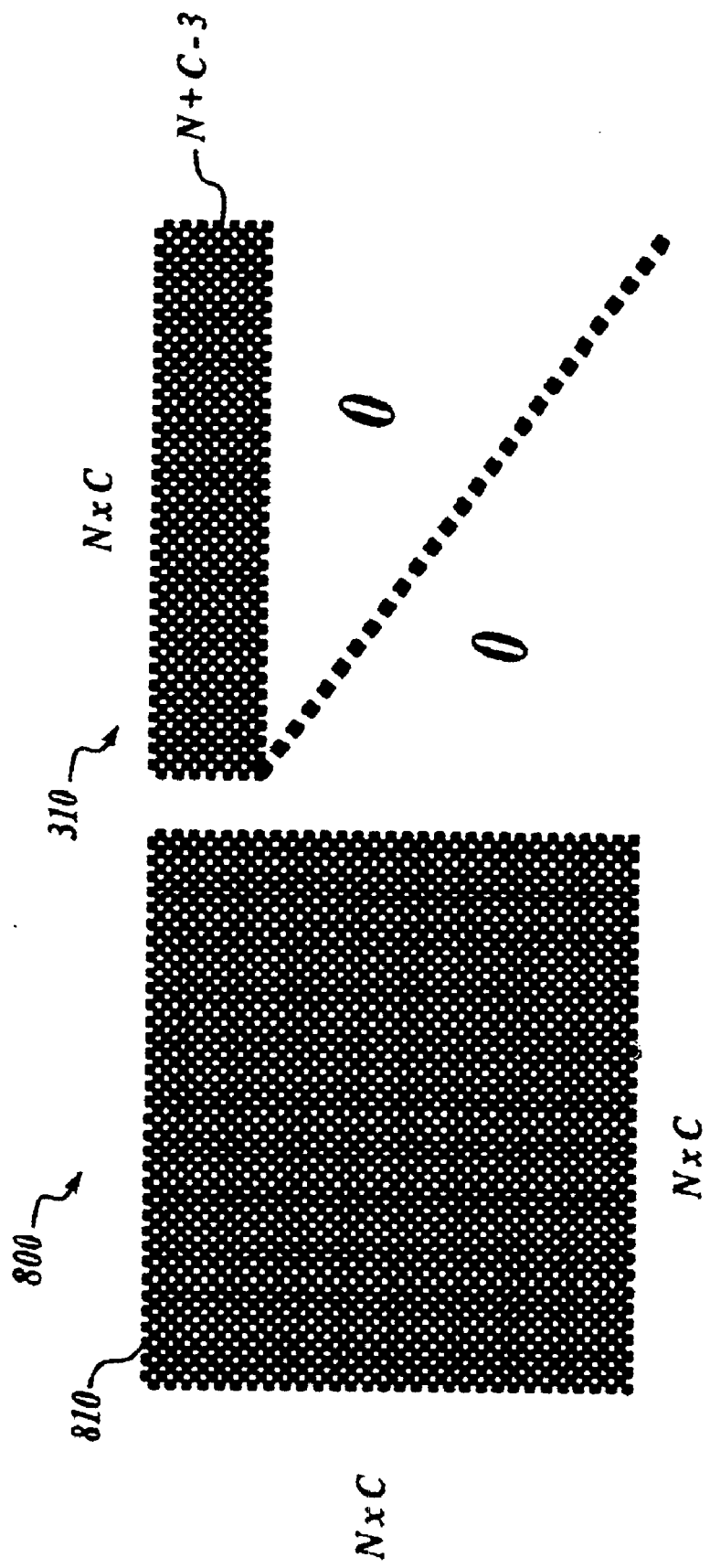
FIG. 8 is a schematic comparison of the impedance matrix 310 of FIG. 3 compared with an impedance matrix of a conventional Method of Moments formulation.

To see why this is important, the steps will be displayed graphically. FIG. 7 is a graphical representation of a QR decomposition of the lower submatrix 510 of FIG. 5. In this embodiment, the sparse submatrix 510 is rewritten as a product of a lower triangular matrix 710 and an orthogonal matrix 720. A lower triangle 712 of non-zeroes has a large number of zeroed matrix elements, and a lowest row 714 is not filled to the end. The reason for this is that the number of columns is greater than the number of rows. It therefore follows that the orthogonal matrix 720 is not unique, which provides the ability to arbitrarily assign independent current loops in a standard network analysis. Although the decomposition of the sparse submatrix 510 is depicted as a product involving an orthogonal matrix 720 in FIG. 7, in alternate embodiments, an alternate post-multiplying matrix could be created representing an ordered set of elementary matrix operators chosen to accomplish triangularization. For example the post-multiplying matrix could represent Gaussian elimination. Whatever the choice of post-multiplier, it is preferable that its inverse may be trivially derived. In symbolic form:

$$S = LQ \qquad (8)$$

where S is the original sparse matrix, L is the lower triangular matrix, and Q is the post-multiplying matrix.

It may be observed from FIG. 7 that the post-multiplying matrix Q is square and the size of the total matrix 500 of FIG. 5. If the total matrix 500 is called T, then the overall equation can be written as $$(TQ)(Q^{-1}X) = RHS \quad (9)$$

The elements of the vector $$Y = Q^{-1}X \quad (10)$$

are analogous to the "loop currents" of standard circuit theory. As mentioned above, the RHS vector (Equation 9) is unchanged, with zeroes in the lower slots corresponding to the positions of the rows of the original sparse matrix 510 in the full matrix 500. It may be appreciated that all the leading elements of the vector Y, equal in number to the number of the rows of the original sparse matrix 510 are zero. This follows from the fact that post-multiplying the full matrix T by Q triangularizes the sparse part of T. Since the matrix equation has not really changed, the first element in Y must be zero, since it is the coefficient of the only term in a linear equation whose right side is zero. Similarly, the second term is zero because it only the coefficient of the second of two terms that appear in a linear equation whose right side is zero. But the coefficient of the first term is zero, so the second term must also be zero.

Using this logic, all the leading terms in Y are zero, leaving only the last vector elements being unknown, not necessarily zeroes, and equal in number to the number of sample points. The leading columns of the dense upper submatrix 520, which has also been transformed by the matrix Q may also be deleted, since they represent coefficients that are zero. What is left is a square matrix whose rank is nominally equal to the number of sample points 610. Using the upper non-zero part of the RHS vector as a right hand side, the lower numbers in the Y vector are calculated. Then applying Q to the vector Y will "fill it up" to form the vector X, which solves the full matrix T.

Although a large number of unknowns is introduced by adding approximation functions in each computational cell, the square matrix to be inverted has a rank no greater than the number of rows of the deflated matrix, which is equal to the number of samples. For example, in the above-described example, adding an additional approximation function in each cell only adds a single extra sample point, which is applied at the ends of the wires. This fact is independent of the number of computational cells. Once "Nyquist" spacing is achieved, it is theoretically unnecessary to increase the number of sampling points in proportion to the total number of unknowns. No more information can theoretically be derived from denser sampling, except at boundaries, where singularities in some of the derivatives generally occur.

Fast, modem, accurate techniques are available to take advantage of the fact that the matrix to be factored is sparse and banded. These techniques may be formulated as the post-multiplying matrix Q, and can be obtained any number of convenient ways. Once the matrix Q is determined for a given covering of a surface, it can be applied to any problem that uses that covering. In one particular aspect, the factorization of the sparse submatrix 510 defines a transformation that decouples the topology of the problem from the wave physics, assigning them to separate vector spaces. The first columns of the matrix Q span the topology space, while the remaining columns span the physics space. Recalculating the wave-interactions on an unchanged covering at any frequency, the same matrix Q will decouple the topology from the from the physics. Thus, going to different frequencies, surface properties, incident directions, etc., make no difference to the topology of the surface and the transformation that deflates the total matrix.

The QR transformation is not the only possible method for producing the desired triangularization. Another embodiment might employ variations of the LU decomposition, which is based on Gaussian elimination. In other words, the transformation deflating the dense matrix is not unique. The analogy to network theory is the observation that the reduction of a network to current loops is generally not unique.

If there are N computational cells, each with r approximating functions in each direction, in d dimensions, the total number of unknowns is $Nr^d$. In "standard" MoM this number of unknowns will require inversion of a dense matrix of rank $Nr^d$, needing on the order of $(r^d N)^2$ matrix elements to be calculated. Inverting this matrix requires on the order of $(Nr^d)^3$ floating-point operations. In some embodiments, if computational cells are "Nyquist" size, then r may be within the range of approximately 10 to approximately 20.

In the scheme proposed, the number of samples is asymptotically equal to N for large values of N (i.e., one sample in each cell). Therefore $N(Nr^d)$ matrix elements are needed, and a sparse matrix has to be factored only once. The resulting deflated matrix needs on the order of $N^3$ floating-point operations. Deflation needs on the order of $N(Nr^d)^2$ floating-point operations, which can be done on a vectorized parallel processing machine as a matrix multiply as opposed to a matrix inversion. Thus, embodiments of methods and systems in accordance with the present invention may be much faster and more efficient than matrix inversion, limited only by the number of processors available.

The following discussion is intended to provide a general description of a suitable computing environment in which the above-described methods in accordance with embodiments of the invention may be implemented. While the invention will be described in the general context of an application program that runs on an operating system in conjunction with a personal computer and in connection with a server, those skilled in the art will readily recognize that the invention may also be implemented in combination with other program modules and on other platforms. Generally, program modules include routines, operating systems, application programs, components, data structures and the like that perform particular tasks or implement particular abstract data types. Moreover, those skilled in the art will appreciate that the invention may be practiced with other computer system configurations, including hand-held devices, multi-processor systems, microprocessor based or programmable computer electronics, minicomputers, mainframe computers, and the like.

Figure 9:
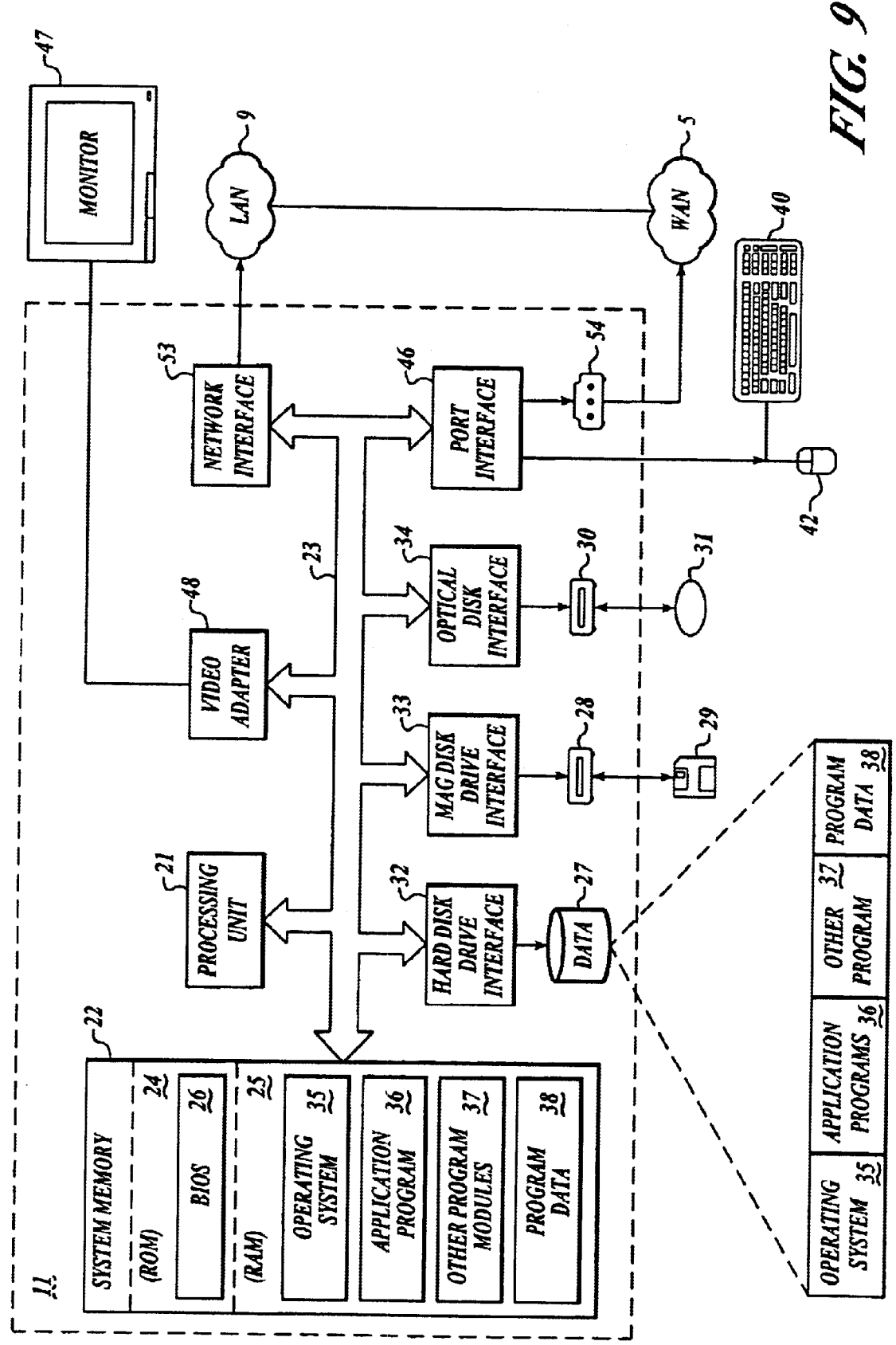
FIG. 9 is a schematic diagram of an exemplary computing system in accordance with still another embodiment of the invention.

With reference to FIG. 9, an exemplary computing system for implementing the invention includes a computer 11 having a processing unit 21, a system memory 22, and a system bus 23 that couples the system memory 22 to the processing unit 21. The system memory 22 includes read-only memory (ROM) 24 and random access memory (RAM) 25. A basic input/output system 26 (BIOS), containing basic routines that help to transfer information between elements with the computer 11 such as during startup is stored in ROM 24. The computer 11 further includes a hard disk drive 27, a magnetic disk drive 28, e.g. to read from or write to a removable disk drive 29, an optical disk drive 30, a CD-ROM disk 31, or to read from or write to other media. The hard disk drive 27, the magnetic disk drive 28, and an optical disk drive 30 are connected to the system bus 23 by a hard disk drive interface 32, a magnetic disk drive interface 33, and an optical disk drive interface 34, respectively. The drives and their associated computer-readable media provide non-volatile storage for the computer 11. Although the description of computer-readable media above refers to a hard disk, a removable magnetic disk, and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs, such as an email program module 36, other program modules, such as the message manager program module 37, a local message store 38, and a database 39 for supporting email applications. A user may enter commands and information into the computer 11 through a keyboard 40 and a pointing device, such as a mouse 42. Other input devices (not shown) may include a pen, a touch operated device, a microphone, a joystick, a game pad, a satellite dish, a scanner, or the like. These and other input devices are often connected to the processing unit 21 through a port interface 46 that is coupled to the system bus, but may be connected by other interfaces, such as a serial port, a game port, or a universal serial bus (USB). A monitor 47 or other type of display device is also connected to the system bus 23 via an interface, such as the Video Adapter 48. In addition to the monitor, personal computers typically include other peripheral output devices (not shown), such as speakers or printers.

The computer 11 operates typically in a networked environment using logical connections to one or more remote computers, such as the remote computer 49. The remote computer 49 may be an email server (which includes one or more message stores), as described above in connection with FIG. 1. A file server (which includes one or more files stores), a router, a peer device or other common network note, and typically includes many or all of the elements described relative to the computer 11. The logical connections depicted in FIG. 2 include the local area network (LAN) or the wide area network to (WAN) 5. Such networking environments are commonplace in offices, enterprise wide computer networks, intranets, and the Internet. When used in a LAN networking environment, the computer 11 is connected to the LAN 9 through a network interface 53 or additionally through the WAN 5. When used in an a WAN networking environment, the computer 11 typically includes a modem 54 or other means for establishing communications over the WAN 5 such as the Internet. The modem 54 which may be internal or external is connected to the system bus 23 via the serial port interface 46.

The invention may also be practiced in distributed computing environments where tasks are performed by remote processing devices that are linked through a communications network. In a distributed computing environment, the program modules may be located in both local and remote memory storage devices. Execution of the program modules may occur locally in a stand-alone manner or remotely in a client/server manner. Examples of such distributed computing environments include local area networks of an office, enterprise wide computer networks, and the Internet. In a networked environment, the program modules depicted relative to the computer 11, or portions thereof, may be stored in the remote memory storage device. It will be appreciated that the network connections shown are exemplary in other means of establishing a communications link between the computers may be used.

While exemplary embodiments of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method of predicting an electromagnetic scattering from a target, comprising:

covering at least a portion of an analytical model of the target with computational cells;

formulating a plurality of approximation functions including simplifying a set of method of moments equations based on Kirchhoff's first law to provide an impedance matrix multiplied by a solution vector equated with a right hand side vector;

setting a plurality of boundary conditions for the plurality of approximation functions; and solving the plurality of approximation functions for the solution vector.

2. The method of claim 1, wherein covering at least a portion of an analytical model of the target with computational cells includes covering at least a portion of the analytical model in accordance with the Nyquist criterion.

3. The method of claim 1, wherein covering at least a portion of an analytical model of the target with computational cells includes covering at least a portion of the analytical model with computational cells having a linear dimension that is less than half of a wavelength of an incident electromagnetic energy.

4. The method of claim 1, wherein covering at least a portion of an analytical model of the target with computational cells includes covering at least a portion of the analytical model with one or more first computational cells located near non-analytic boundaries and having a first linear dimension substantially smaller than half of a wavelength of an incident electromagnetic energy, and one or more second computational cells spaced apart from non-analytic boundaries and having a second linear dimension approximately equal to half of the wavelength of the incident electromagnetic energy.

5. The method of claim 1, wherein formulating a plurality of approximation functions includes simplifying a set of method of moments equations to provide an impedance matrix having a sparse lower submatrix and a non-square, relatively dense upper submatrix.

6. The method of claim 1, wherein formulating a plurality of approximation functions includes formulating a number of approximation functions on the order of a number of computational cells.

7. The method of claim 1, wherein formulating a plurality of approximation functions includes formulating a linear combination of analytic functions.

8. The method of claim 7, wherein formulating a linear combination of analytic functions includes formulating a linear combination of at least one of polynomial functions and power series functions.

9. The method of claim 1, wherein setting a plurality of boundary conditions includes forcing at least some derivatives of at least some of the approximation functions to be continuous.

10. The method of claim 1, wherein setting a plurality of boundary conditions includes forcing a value of at least some of the approximation functions to be continuous.

11. The method of claim 1, wherein solving the plurality of approximation functions for the solution vector includes:
modeling an electromagnetic source; and
populating the impedance matrix and the right hand side vector.

12. The method of claim 1, wherein solving the plurality of approximation functions for the solution vector includes reducing the impedance matrix to a single equations at sample points, generally one in each cell, by a transform.

13. The method of claim 1, wherein solving the plurality of approximation functions for the solution vector includes reducing the impedance matrix to a diagonalized matrix by a transform.

14. The method of claim 13, wherein the transform employs only arithmetic adds.

15. The method of claim 1, wherein solving the plurality of approximation functions for the solution vector includes transforming a lower sparse submatrix of the impedance matrix into a lower triangular matrix.

16. The method of claim 15, wherein the lower sparse submatrix is transformed into a lower triangular matrix by a QR decomposition.

17. The method of claim 15, wherein the lower sparse submatrix is transformed into a lower triangular matrix by an ordered set of matrix operators.

18. The method of claim 15, wherein the lower sparse submatrix is transformed into a lower triangular matrix by a Gaussian elimination operator.

19. The method of claim 1, further comprising providing a plurality of sampling points distributed into at least some of the computational cells.

20. The method of claim 19, wherein providing a plurality of sampling points distributed into at least some of the computational cells includes providing a plurality of sampling points based on at least one of an incident electromagnetic wave, a distribution of computational cells on the analytical model, and a resultant current distribution.

21. The method of claim 19, wherein providing a plurality of sampling points includes providing one sampling point in each free-field computational cell, and providing more than one sampling points in each non-analytic boundary computational cell.

22. A computer program product for predicting an electromagnetic scattering from a target, comprising:
a first computer program portion adapted to cover at least a portion of an analytical model of the target with computational cells;
a second computer program portion adapted to formulate a plurality of approximation functions including simplifying a set of method of moments equations based on Kirchhoff's first law to provide an impedance matrix multiplied by a solution vector equated with a right hand side vector;
a third computer program portion adapted to set a plurality of boundary conditions for the plurality of approximation functions; and
a fourth computer program portion adapted to solve the plurality of approximation functions for the solution vector.

23. The computer program product of claim 22, wherein the first computer program portion is further adapted to cover at least a portion of the analytical model in accordance with the Nyquist criterion.

24. The computer program product of claim 22, wherein the first computer program portion is further adapted to cover at least a portion of the analytical model with computational cells having a linear dimension that is less than half of a wavelength of an incident electromagnetic energy.

25. The computer program product of claim 22, wherein the second computer program portion is further adapted to simplify a set of method of moments equations to provide an impedance matrix having a sparse lower submatrix and a non-square, relatively dense upper submatrix.

26. The computer program product of claim 22, wherein the second computer program portion is further adapted to formulate a linear combination of at least one of polynomial functions and power series functions.

27. The computer program product of claim 22, wherein the third computer program portion is further adapted to force at least some derivatives of at least some of the approximation functions to be continuous.

28. The computer program product of claim 22, wherein the third computer program portion is further adapted to force a value of at least some of the approximation functions to be continuous.

29. The computer program product of claim 22, wherein the fourth computer program portion is further adapted to model an electromagnetic source, and populate the impedance matrix and the right hand side vector.

30. The computer program product of claim 22, wherein the fourth computer program portion is further adapted to reduce the impedance matrix to a single equation by a transform.

31. The computer program product of claim 22, wherein the fourth computer program portion is further adapted to reduce the impedance matrix to a diagonalized matrix by a transform.

32. The computer program product of claim 22, further comprising a fifth computer program portion adapted to provide a plurality of sampling points distributed into at least some of the computational cells.

33. The computer program product of claim 22, further comprising a fifth computer program portion adapted to provide a plurality of sampling points based on at least one of an incident electromagnetic wave, a distribution of computational cells on the analytical model, and a resultant current distribution.

34. A computer system for predicting an electromagnetic scattering from a target, comprising:
a memory device;
a processor operatively coupled to the memory device and adapted to perform electromagnetic scattering computations, the processor including:
a first component adapted to cover at least a portion of an analytical model of the target with computational cells;
a second component adapted to formulate a plurality of approximation functions including simplifying a set of method of moments equations based on Kirchhoff's first law to provide an impedance matrix multiplied by a solution vector equated with a right hand side vector;
a third component adapted to set a plurality of boundary conditions for the plurality of approximation functions; and
a fourth component adapted to solve the plurality of approximation functions for the solution vector.

35. The computer system of claim 34, wherein the first component is further adapted to cover at least a portion of the analytical model with computational cells having a linear dimension that is less than half of a wavelength of an incident electromagnetic energy.

36. The computer system of claim 34, wherein the second component is further adapted to simplify a set of method of moments equations to provide an impedance matrix having a sparse lower submatrix and a non-square, relatively dense upper submatrix.

37. The computer system of claim 34, wherein the third component is further adapted to force at least some derivatives of at least some of the approximation functions to be continuous.

38. The computer system of claim 34, wherein the third component is further adapted to force a value of at least some of the approximation functions to be continuous.

39. The computer system of claim 34, wherein the fourth component is further adapted to reduce the impedance matrix to a single equation by a transform.

40. The computer system of claim 34, wherein the fourth component is further adapted to reduce the impedance matrix to a diagonalized matrix by a transform.

41. The computer system of claim 34, further comprising a fifth component adapted to provide a plurality of sampling points distributed into at least some of the computational cells.

42. The computer system of claim 34, further comprising a fifth component adapted to provide a plurality of sampling points based on at least one of an incident electromagnetic wave, a distribution of computational cells on the analytical model, and a resultant current distribution.

* * * * *